(12) United States Patent
Tanaka et al.

(10) Patent No.: US 12,092,525 B2
(45) Date of Patent: Sep. 17, 2024

(54) WORK MEASUREMENT SYSTEM, EDUCATION SYSTEM, AND QUALITY CONTROL SYSTEM

(71) Applicants: Hitachi, Ltd., Tokyo (JP); Daikin Industries, Ltd., Osaka (JP)

(72) Inventors: Akihide Tanaka, Tokyo (JP); Hiroshi Yoshikawa, Tokyo (JP); Shinya Kaneko, Tokyo (JP); Isamu Takahashi, Tokyo (JP); Naoya Okizaki, Tokyo (JP); Xudong Zhang, Tokyo (JP); Yasunori Hama, Osaka (JP)

(73) Assignees: HITACHI, LTD., Tokyo (JP); DAIKIN INDUSTRIES, LTD., Osaka (JP)

( * ) Notice: Subject to any disclaimer, the term of this patent is extended or adjusted under 35 U.S.C. 154(b) by 298 days.

(21) Appl. No.: 17/637,168

(22) PCT Filed: Aug. 28, 2020

(86) PCT No.: PCT/JP2020/032742
§ 371 (c)(1),
(2) Date: Feb. 22, 2022

(87) PCT Pub. No.: WO2021/065276
PCT Pub. Date: Apr. 8, 2021

(65) Prior Publication Data
US 2022/0283035 A1 Sep. 8, 2022

(30) Foreign Application Priority Data
Sep. 30, 2019 (JP) .................. 2019-178310

(51) Int. Cl.
*G01J 5/48* (2022.01)
*B23K 1/012* (2006.01)
*G09B 19/24* (2006.01)

(52) U.S. Cl.
CPC ............ *G01J 5/48* (2013.01); *B23K 1/012* (2013.01); *G09B 19/24* (2013.01)

(58) Field of Classification Search
CPC ...... G01J 5/48; G01J 5/026; G01J 2005/0074; G01J 5/0003; G01J 5/0859;
(Continued)

(56) References Cited

U.S. PATENT DOCUMENTS 7,809,725 B1 * 10/2010 Vasilik .................. G06Q 10/00
715/208
11,874,843 B1 * 1/2024 Smith .................... G06F 3/0482
(Continued)

FOREIGN PATENT DOCUMENTS

| JP | 02-070376 A | 3/1990 |
| JP | 07-043217 A | 2/1995 |

(Continued)

OTHER PUBLICATIONS

International Search Report, PCT/JP2020/032742, Oct. 13, 2020, 2 pgs.

*Primary Examiner* — Md M Rahman
(74) *Attorney, Agent, or Firm* — Volpe Koenig (57) ABSTRACT

A burner work measurement system configured to measure work using a burner is provided. The burner work measurement system includes one or more cameras configured to capture the work and a control unit configured to perform computing processing on images captured by the cameras, the control unit is configured to create work data obtained by calculating, based on the images captured by the cameras, at least one of a positional relation between a work object and the burner or flame, a positional relation between the work object and a brazing filler metal, and a positional relation between the burner or the flame and the brazing filler metal.

14 Claims, 5 Drawing Sheets

(58) Field of Classification Search
CPC . G01J 2005/0077; B23K 1/012; B23K 3/021;
B23K 3/08; B23K 31/125; G09B 19/24;
G09B 5/02
USPC .......................................................... 356/45
See application file for complete search history.

(56) References Cited

U.S. PATENT DOCUMENTS

2003/0010813 A1* 1/2003 Nakaya ................. B23K 3/087
228/41
2021/0063316 A1 3/2021 Endou et al.

FOREIGN PATENT DOCUMENTS

| JP | 11-005158 A | 1/1999 |
| JP | 2003-025065 A | 1/2003 |
| JP | 2018-065175 A | 4/2018 |
| JP | 2018149586 A * | 9/2018 |
| JP | 2019-056622 A | 4/2019 |

* cited by examiner

| BRAZING FILLER METAL CHARGING TEMPERATURE (°C) | LOWER THAN 600 | 600-850 | 850 OR HIGHER |
|---|---|---|---|
| QUALITY | BRAZING FILLER METAL MELTING INSUFFICIENT | GOOD PRODUCT | BRAZING FILLER METAL DRIPPING |

FIG. 5B

| BRAZING FILLER METAL ANGLE IN HORIZONTAL DIRECTION (°) | 0° TO LESS THAN 70° EXEED 110° TO 180° | 70° TO 110° |
|---|---|---|
| QUALITY | MELTED IN LARGE QUANTITY, CAUSING DRIPPING AND NON-PENETRATION | GOOD PRODUCT |

WORK MEASUREMENT SYSTEM, EDUCATION SYSTEM, AND QUALITY CONTROL SYSTEM

BACKGROUND OF THE INVENTION

1. Field of the Invention

The present application claims priority from Japanese Patent Application No. 2019-178310 filed on Sep. 30, 2019, contents of which are incorporated into the present application by reference. The present invention relates to a work measurement system that measures work, and an education system and a quality control system that use measurement results of the work measurement system.

2. Description of the Related Art

Under the recent social situations, the manufacturing environment has been greatly changed. For example, due to an increase in products of overseas production, an increase in products procured from overseas, a decrease in skilled workers, and the like, the manufacturing skills are difficult to be maintained, and quality control is in a more severe situation. Until now, a skill transfer method has been transferred by direct teaching from skilled workers. However, since the means for transferring a skill is not sufficient and often becomes sensory teaching, teaching takes time or the skill is inaccurately transferred, and therefore, there is a concern that the skill is not completely transferred and is lost.

With the development of measurement techniques in recent years, efforts to measure and evaluate the skill of skilled workers have been found. As a method for solving a problem in skill transfer in related art, an effort to measure and evaluate a work performed by a skilled worker using various measurement devices has been made.

Joining work such as brazing or welding is one of the important steps in manufacturing a large structure or a member having a complicated shape. In particular, in a structure in which a stress is applied to a joining portion or a sealed container in which a stress from an internal pressure is applied, since the degree of bonding is related to safety, a step of confirming the quality of work is provided. In general, defects in joining are detected by a destructive inspection performed by extraction or a non-destructive inspection performed by an X-ray image or ultrasonic flaw detection, and the quality is controlled. When a defect or an incomplete portion is detected, since a rework step is added, the delay of the steps occurs.

In recent years, a camera capable of capturing, in detail, a phenomenon accompanied by movement of a substance in a time direction and a sensor capable of converting various phenomena into numerical data have been developed. It is required to capture a state of joining by such a sensor, prevent an occurrence of the defect and the incomplete portion, and control the quality.

JP-A-2018-65175 discloses a brazing device configured to braze an object, the brazing device including: a burner configured to heat the object, a first visible light camera configured to capture a heated portion of the object heated by the burner, a temperature specifying mechanism configured to specify a temperature of the heated portion based on a captured image or a captured moving image captured by the first visible light camera, a brazing filler metal supply mechanism configured to supply brazing filler metal to the heated portion when the temperature specified by the temperature specifying mechanism is a predetermined temperature or higher, and a hand configured to integrally support the burner, the first visible light camera, and the brazing filler metal supply mechanism, in which brazing is performed by moving, by the hand, the burner, the first visible light camera, and the brazing filler metal supply mechanism so as to draw a trajectory along a predetermined path (see claim 1).

However, in the method described in JP-A-2018-65175, since a temperature is predicted based on the color change of the image acquired by the visible light camera attached to a hand, it is difficult to measure the temperature with high accuracy. The acquired parameter is only a temperature, which is not sufficient data to be used for operator education. Since a temperature of a portion that is not shown in an image is not known only by capturing in one direction, temperature distribution of the entire object to be brazed is difficult to be known. The camera is attached to the hand together with the burner, and a portion where a flame of the object to be brazed is applied is not known. Further, an accuracy of depth information such as a distance between the object to be brazed and the flame is reduced.

SUMMARY OF THE INVENTION

In view of the above, an object of the invention is to provide a brazing work measurement system capable of improving the accuracy of quality estimation and being applied to an education system by three-dimensionally visualizing an operation of a worker and associating the operation with a temperature acquired at the same time in a brazing work.

A representative example of the invention disclosed in the present application is as follows. That is, a burner work measurement system configured to measure work using a burner includes: one or more cameras configured to capture the work; and a control unit configured to perform computing processing on an image captured by the cameras in which the control unit is configured to create work data obtained by calculating, based on the images captured by the cameras, at least one of a positional relation between a work object and the burner or flame, a positional relation between the work object and a brazing filler metal, and a positional relation between the burner or the flame and the brazing filler metal.

According to an aspect of the invention, a system that contributes to a reduction in a defect rate is provided. Problems, configurations, and effects other than those described above will be clarified with the following description of an embodiment.

DESCRIPTION OF THE PREFERRED EMBODIMENTS

As an embodiment of the invention, a brazing work measurement system that measures brazing work, and a quality control system and an education system that use the measurement results will be described with reference to the drawings below.

First Embodiment

Figure 1:
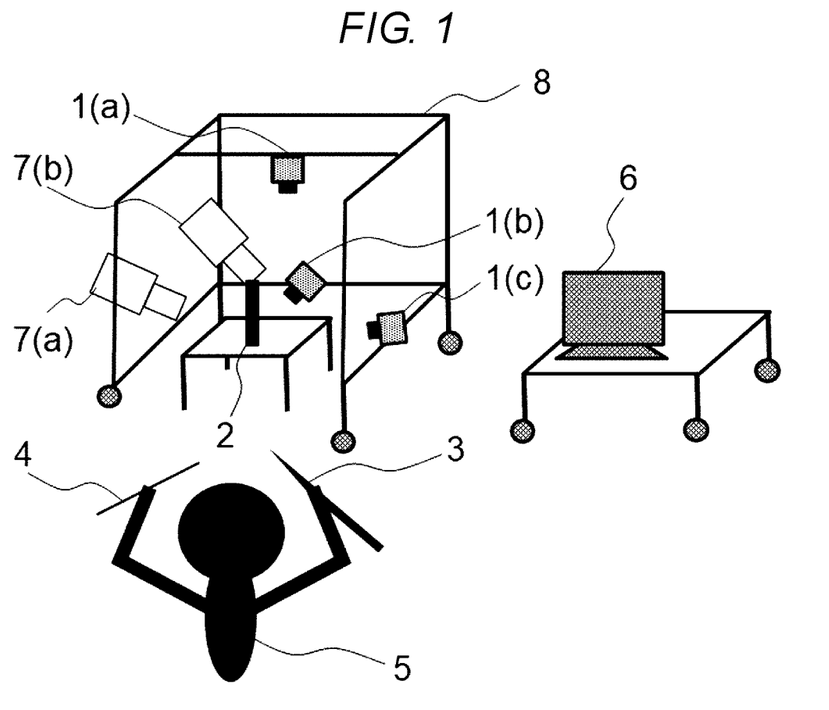
FIG. 1 is an overall view of a brazing work measurement system.

FIG. 1 is an overall view of a brazing work measurement system according to a first embodiment.

The brazing work measurement system of the first embodiment includes work measurement cameras 1 (a), 1 (b), and 1 (c), a control unit (control device) 6, and brazing work thermometers 7 (a) and 7 (b). The work measurement cameras 1 (a), 1 (b), and 1 (c), and brazing work thermometers 7 (a) and 7 (b) are fixed a jig 8. The work measurement cameras 1 (a), 1 (b), and 1 (c) capture images of an object to be brazed 2, a gas burner 3 that is a jig for brazing, and a brazing filler metal 4. For example, as shown in FIG. 1, the work measurement camera 1(a) is disposed at a position to capture an image from an upper side, the work measurement camera 1(b) is disposed at a position to capture an image from a back side, and the work measurement camera 1(c) is disposed at a position to capture an image from a side. The gas burner 3 includes a mechanism for discharging flame. A worker 5 heats the object to be brazed 2 (for example, copper) and then supplies the brazing filler metal 4 to braze the object to be brazed 2.

The control unit 6 is, for example, a control device configured with a computer including computation processing device (for example, a CPU), a storage device (for example, a semiconductor memory such as a ROM and a RAM, or a magnetic storage device such as an HDD, and corresponding to a "storage portion" described below) configured to store a program or data executed by the computation processing device, a display device (for example, a monitor and a touch panel) configured to display a computation result of the computation processing device, and a communication device configured to control communication with other devices in accordance with a predetermined protocol, and performs computation processing on images captured by the work measurement cameras 1 (a), 1 (b), and 1 (c) and temperatures of the object to be brazed 2 measured by the brazing work thermometers 7 (a) and 7 (b). In the computation processing device, a part of processing performed by the CPU executing the program may be executed by another computation device (for example, a computation device configured with hardware such as an FPGA and an ASIC). A terminal connected to the control unit 6 via a network may function as an input device and the output device.

The program executed by the computation processing device is provided to the control unit 6 via a removable medium (CD-ROM, flash memory, and the like) or a network, and is stored in a non-volatile storage device which is a non-transitory storage medium. Therefore, the control unit 6 may have an interface for reading data from the removable medium.

The control unit 6 may be a computer system formed by one physical computer or by a plurality of logical or physical computers, or may be operated on a virtual computer constructed on a plurality of physical computer resources.

The work measurement cameras 1(a), 1(b), and 1 (c) are disposed around the worker 5 and the object to be brazed 2, and measure the movement of the gas burner 3 or the flame and the brazing filler metal 4 when the worker 5 brazes the object to be brazed 2. The work measurement cameras 1 (a), 1(b), and 1 (c) are connected to the control unit 6. The work measurement cameras 1(a), 1(b), and 1(c) are provided, so that the worker 5 and the object to be brazed 2 can be captured from different directions (desirably, three orthogonal directions) in a manner that the movement can be measured three-dimensionally. In the present embodiment, the work measurement cameras are provided on the side, the upper side, and the back side of the worker 5, respectively.

Figure 2A:
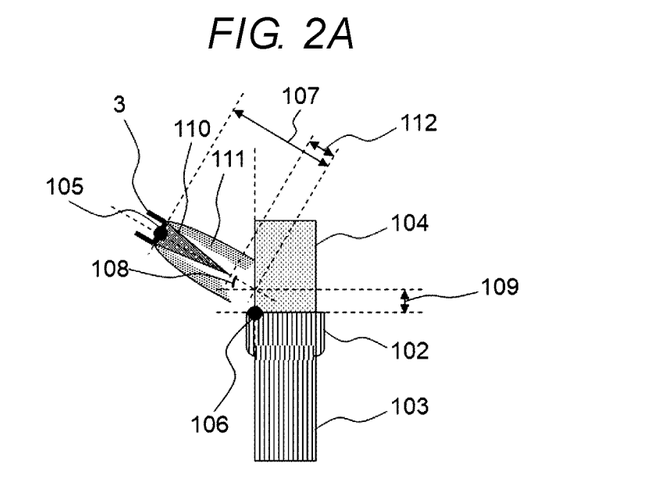
FIGS. 2A to 2C are diagrams showing an example of images captured by work measurement cameras.
Figure 2B:
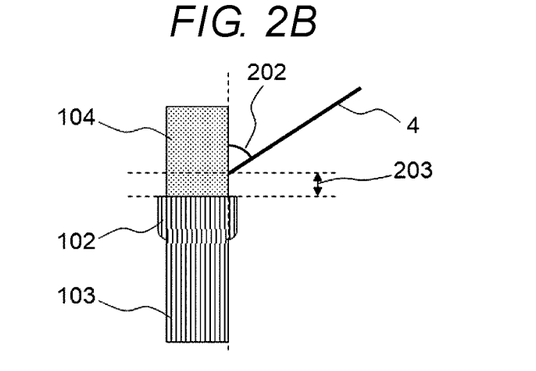
Figure 2C:
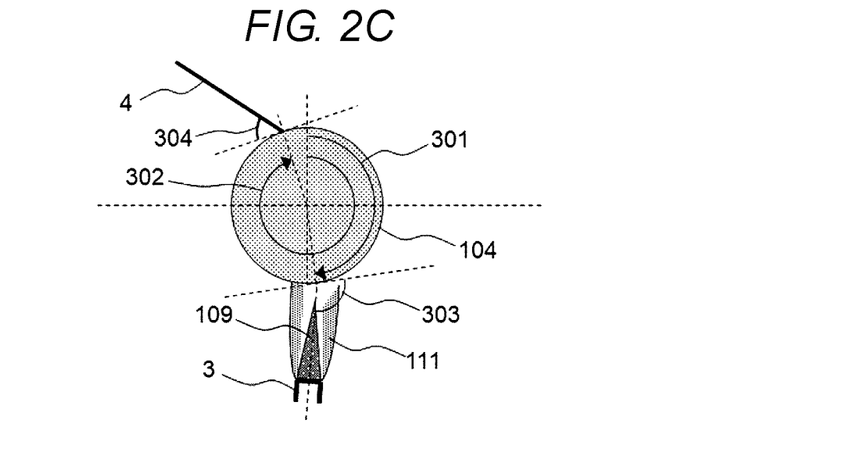

FIGS. 2A, 2B, and 2C show images captured by work measurement cameras 1 (a), 1(b), and 1(c). FIG. 2A show an image captured from the side and shows the gas burner 3, a joint 102, an outer tube 103, and an inner tube 104. In the present embodiment, the joint 102 which is the object to be brazed 2 is a joint in which the outer tube 103 that has a bulge where the inner tube 104 fits in an upper portion is provided on a lower side, and the inner tube 104 is inserted into the outer tube 103 from the upper side.

The control unit 6 analyzes moving images captured by the work measurement cameras 1(a), 1(b), and 1(c) and recognizes positions of the joint 102, the gas burner 3, and the brazing filler metal 4. Based on the image captured from the side by the work measurement camera 1 (c) shown in FIG. 2A, a vertical positional relation between the gas burner 3 and the joint 102 can be mainly recognized. The control unit 6 analyzes the image and recognizes a position 105 of a base of the flame at a tip of the gas burner 3, a position 106 of the joint 102 closest to the worker 5, a distance 107 between the gas burner 3 and the joint 102, an angle 108 of the flame in a vertical direction, and a height 109 at which the flame discharged from the gas burner 3 is applied.

FIG. 2B shows an image obtained by capturing the work from the back side in the same manner as in FIG. 2A, and shows the gas burner 3, the brazing filler metal 4, the inner tube 104. Based on the image captured from the back side by the work measurement camera 1 (b) shown in FIG. 2B, a vertical positional relation between the brazing filler metal 4 and the object to be brazed 2 can be mainly recognized. The control unit 6 analyzes the image and recognizes an angle 202 of the brazing filler metal 4 in a vertical direction and a height 203 at which the brazing filler metal 4 is applied.

FIG. 2C shows an image obtained by capturing the work from the upper side in the same manner as in FIG. 2A, and shows the brazing filler metal 4, the joint 102, the outer tube 103, and the inner tube 104. Based on the image captured from the upper side by the work measurement camera 1(a) shown in FIG. 2C, a horizontal positional relation between the gas burner 3, the brazing filler metal 4, and the object to be brazed 2 can be mainly recognized. In the image shown in FIG. 2C, since the cross section of the joint 102 is circular, the image may be represented by polar coordinates with the center of the joint 102 as the origin. The control unit 6 analyzes the image and recognizes a position 301 in the horizontal direction where the flame is applied, a position 302 in the horizontal direction where the brazing filler metal 4 is applied, an angle 303 of the flame in the horizontal direction, and an angle 304 of the brazing filler metal 4 in the horizontal direction. When the object to be brazed 2 is a cylinder, the angle 303 and the angle 304 are preferably calculated as angles with respect to a tangent line of a circle of a cross section of the cylinder.

As shown in FIGS. 2A, 2B, and 2C, by providing the work measurement cameras 1(a), 1(b), and 1(c) in three different directions, a three-dimensional operation can be measured in the vertical direction and the horizontal direction and work can be three-dimensionally recognized.

In the present embodiment, a positional relation (distance, angle) between the joint 102 and the gas burner 3 and a positional relation (distance, angle) between the joint 102 and the brazing filler metal 4 were calculated using images captured by the work measurement cameras 1(*a*), 1(*b*), and 1 (*c*), but a positional relation (distance, angle) between the gas burner 3 and the brazing filler metal 4 may be calculated. That is, at least one of the three types of positional relations among the three members (the joint 102, the gas burner 3, and the brazing filler metal 4) described above may be calculated to create work data.

In the present embodiment, although a position of an object is calculated for each of the images captured by the work measurement cameras 1(*a*), 1(*b*), and 1(*c*), in the case of an operation of frequently moving the gas burner 3, since the accuracy of the angle and the distance analyzed based on one image is reduced, a plurality of images are preferably used in three-dimensional analysis. In the case where the movement of the gas burner 3 is small and simple, as shown in FIGS. 2A, 2B, and 2C, the position of the object may be calculated for each image, and in this case, the calculation is preferable from the viewpoint of processing time. Further, the position of the object may be calculated by using a monocular range image camera that can measure a distance at the time of capturing an image.

A three-dimensional coordinate may be acquired by providing a plurality of cameras and measuring an operation using a marker type motion capture that recognizes a captured marker.

In the present embodiment, although objects to be evaluated are the brazing filler metal 4, the gas burner 3, and the object to be brazed 2, a mechanism for evaluating an operation of the worker 5 may be used in combination. The operation of the worker 5 can be evaluated by image analysis of a camera, a time of flight (ToF) sensor, motion capture by a marker attached to the body of the worker 5, or the like.

Further, it is preferable to have a function capable of evaluating a change in the color of the object to be brazed 2 or a change in the color of the flame based on the image captured by the camera and estimating a temperature distribution of the object to be brazed 2. The work data including data associated with the temperature distribution of the object to be brazed 2 and the positional relations of the joint 102, the gas burner 3, and the brazing filler metal 4 may be created. In this case, when the temperature estimated based on information of the brazing work thermometers 7 (*a*) and 7 (*b*) is corrected, the accuracy of estimating the temperature can be improved. In the brazing, the color of the object to be brazed 2 or the flame may change depending on the temperature of the object to be brazed 2, the timing of the next operation may be determined depending on any one of the temperature of the object to be brazed 2, the color of the object to be brazed 2, and the color of the flame, and therefore the timing to start the next operation is preferably presented to the worker 5. The presentation to the worker may be displayed on a display device (not shown) provided in a work place, or may be performed by issuing a warning sound or a voice.

The flame is discharged from the gas burner 3, and a to-be measured object may be the gas burner 3, the flame, or both. The flame of a general gas includes an inner flame 110 and an outer flame 111 as shown in FIG. 2A, and it is preferable that there is a function of distinguishing the inner flame 110 from the outer flame 111 according to the color of the flame in the image. Further, in order to evaluate the brazing work, when a distance 112 from a tip of the inner flame 110 to the object to be brazed 2 is evaluated by placing the to-be measured object on the tip of the inner flame 110, the amount of heat applied to the object to be brazed 2 can be accurately evaluated, which is more preferable. Since a marker cannot be placed on a flame, a camera, instead of the motion capture, is preferably used in the case of measuring a flame.

Further, an analysis function capable of determining whether the brazing filler metal appropriately wraps based on the information from the camera of FIG. 2A or the like may be achieved. Whether the brazing filler metal appropriately wraps can be determined based on, for example, whether the brazing filler metal wraps around the entire range in a circumferential direction to form a fillet, or whether the brazing filler metal forms a fillet up to an appropriate range in a height direction, or the like.

In the camera, a filter may be used to make it easy to identify a measurement object. For example, in order to weaken the brightness of the flame in the image, a filter having a low transmittance of 600 nm to 800 nm, which is a wavelength of orange or red, may be used. However, when the invention is used for education of the worker 5, a color close to the color viewed by a person is preferably reproduced.

The brazing work thermometers 7(*a*) and 7(*b*) are used for measuring the temperature of the object to be brazed 2, and for example, radiation thermometers that measure radiant heat can be used. In the brazing, the temperature is an important factor, and the work measurement cameras 1(*a*), 1(*b*), and 1(*c*) are preferably used in combination and the capturing of the image and the measurement of the temperature are preferably simultaneously performed. In the present embodiment, two thermometers are provided, but one or three or more thermometers may be provided, and two or more thermometers are preferably provided to measure temperatures at a plurality of points since the effect of using the thermometers for education and quality control is improved.

If the brazing work thermometers 7(*a*) and 7(*b*) can measure the temperature, the radiation thermometer may not be used, but a non-contact measurement method is more preferable from a viewpoint of ease of installation and low frequency of replacement, than a contact measurement method, such as a thermocouple, that is in directly contact to the object to be brazed 2. The non-contact type thermometer includes thermography that measures a temperature within a certain range and a radiation thermometer that measures a temperature at one point, but from the viewpoint of accuracy and cost, the radiation thermometer is preferable.

Figure 3:
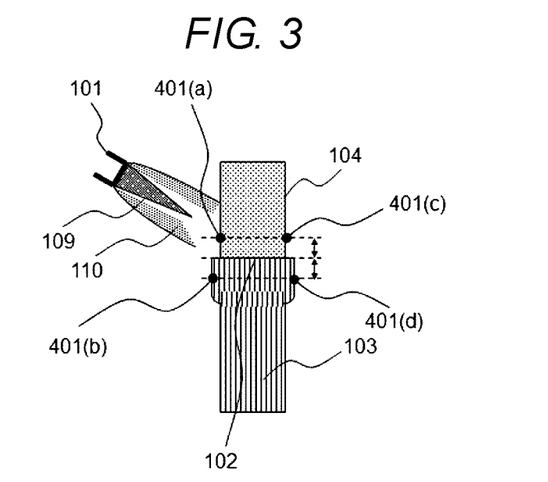
FIG. 3 is a diagram showing a temperature measuring position.

FIG. 3 shows a position of measuring the temperature. Four different positions in a height direction of two measurement points 401 (*a*) and 401 (*b*) on a front side and two measurement points 401 (*c*) and 401 (*d*) on a back side as viewed from the worker 5 may be measured. That is, two or more temperature measurement points may be provided in at least one of a front-rear direction, a height direction, and a circumferential direction of the joint 102. At the time of the brazing work, it is preferable to control a certain range to maintain the same temperature, and it is preferable to set the temperature measurement position with reference to the range. In the present embodiment, although a plurality of measurement points are provided in the front-rear direction and the height direction, it is preferable to appropriately provide radiation thermometers in the circumferential direction and control the temperature distribution.

In the case of using radiation thermometers that measure radiant heat as in the present embodiment, it is preferable to measure temperature at a wavelength at which the spectral intensity of the flame is small to avoid the influence of the flame as much as possible. For example, a wavelength band of 3.9 µm may be used.

In the case of using the radiation thermometers, it is important to set the emissivity, and the emissivity can be determined based on the color of the object to be brazed 2 of the images captured by the work measurement cameras 1 (*a*), 1 (*b*), and 1 (*c*). In particular, in the case where the object to be brazed 2 is copper, when the flame is removed at a temperature higher than a certain level, the copper is oxidized and the emissivity changes. When the emissivity of the radiation thermometers is adjusted according to the alteration of the object to be brazed 2 known based on the image, preferably, the temperature can be corrected to a true temperature and the accuracy of the temperature can be improved.

Regarding the temperature, preferably, a function of detecting the position and the application method of the flame based on the images of FIGS. 2A, 2B, and 2C and estimating the temperature of the object to be brazed 2 is achieved, but temperatures other than those at the temperature measurement points can also be known. In this case, when the temperature estimated based on the information of the brazing work thermometers 7(*a*) and 7(*b*) is corrected, the accuracy of estimating the temperature can be improved. Further, it is more preferable to analyze the temperature as a distribution using an image.

Brazing environment data such as a gas flow rate, a temperature, a humidity, and a wind power may be measured using a temperature and humidity and wind measurement device and a gas flow meter in combination. Brazing measurement data, such as the color and the temperature of the object to be brazed 2, and the brazing environment data are sent to the control unit 6 and stored as accumulated data in a storage portion in the control unit 6. Further, the control unit 6 has a function of displaying the measured data.

Figure 4A:
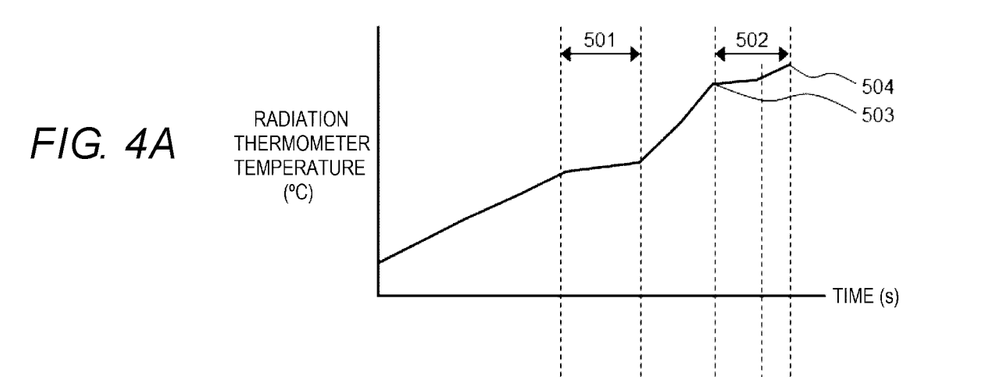
FIGS. 4A to 4C show diagrams showing results of measuring a brazing work.
Figure 4B:
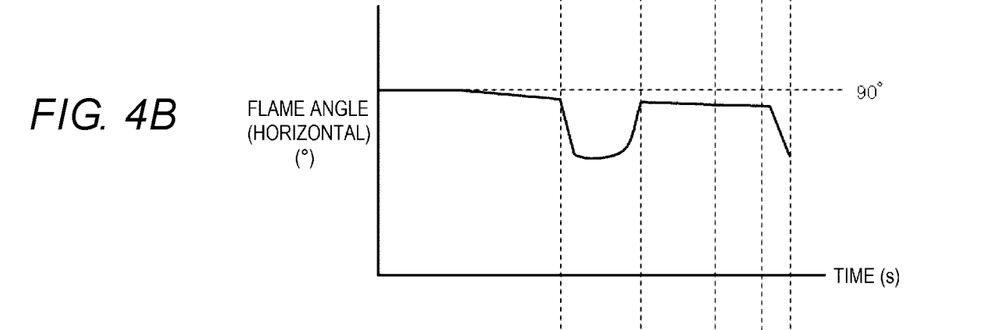
Figure 4C:
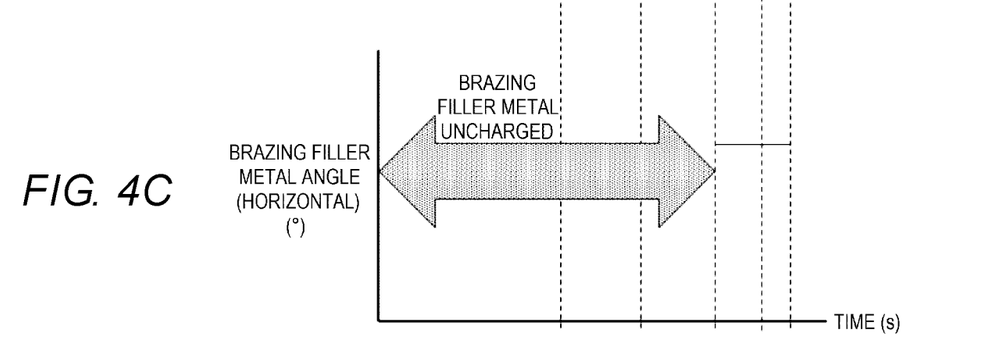

FIGS. 4A to 4C show outlines of results of measuring the brazing work using the brazing work measurement system according to the present embodiment. As shown in FIGS. 4A to 4C, the work measurement system according to the present embodiment can calculate the work performed at each time, the work position, the time, and the measurement result of the temperature at each position. FIG. 4A shows the temperature at a measurement point 401 (*a*) measured by the radiation thermometer, FIG. 4B shows the angle 303 of the flame in the horizontal direction, and FIG. 4C shows the angle 304 of the brazing filler metal 4 in the horizontal direction. Since the worker 5 initially set the angle of the flame to approximately 90°, the temperature is appropriately increased, but since the flame is inclined with respect to the object to be brazed 2 in a region 501, the temperature of the object to be brazed 2 decreases, the operation is thereafter appropriately returns, and the brazing filler metal 4 is charged in a region 502.

In FIGS. 4A to 4C, the correspondence between the temperature and the operation is expressed in data in an easy-to-understand way, and when the brazing work measurement system according to the present embodiment is used, the temperatures of a work object measured by the brazing work thermometers 7(*a*) and 7(*b*) (or the temperature distribution estimated based on the images captured by the cameras) are associated with the positional relation of the joint 102, the gas burner 3, and the brazing filler metal 4, and a burner work can be evaluated. For example, the reason why the temperature rise becomes slow can be easily known.

If a brazing filler metal charging temperature 503 is lower than a liquidus temperature of the brazing filler metal 4, the brazing filler metal 4 does not melt and the brazing filler metal does not flow, and therefore the strength of the joint 102 decreases. When the temperature 504 at the end of heating is higher than a solidus temperature of the joint 102, the joint 102 may be melted, resulting in defective products. In this way, effective education and quality control can be performed by analyzing the temperature at the timing when the operation changes.

As described above, in the brazing work measurement system according to the present embodiment, a positional relation between the object to be brazed 2 (the joint 102) and the gas burner 3 held by the worker 5, that is, a positional relation between the object to be brazed 2 and the worker 5 can be measured, and a brazing work measurement system that creates work data obtained by accurately analyzing the brazing work in three dimensions can be provided.

In the brazing work measurement system according to the present embodiment, since the temperature during work is measured, effective education and quality control can be performed by using the temperature that is the result of the operation.

Second Embodiment

In the second embodiment, an example of a quality control system and an education system to which the brazing work measurement system according to the first embodiment is shown. Since a configuration of the brazing work measurement system, a brazing method, and the object to be brazed 2 are the same as those of the first embodiment, the same reference numerals are given to the same parts as those of the first embodiment, and descriptions thereof will be omitted.

First, the quality control system to which the brazing work measurement system according to the first embodiment is described. The quality control system according to the present embodiment stores in advance work data (for example, brazing work operation data, brazing measurement data, and brazing environment data) acquired in the past and quality data of a brazed portion, and compares the data with newly measured work data to determine the quality of the brazed portion by a quality determination portion. The quality determination portion can evaluate a work level of the worker 5. The quality determination portion may be mounted on one computer together with the control unit 6, or may be mounted on a computer different from the control unit 6.

Figure 5A:
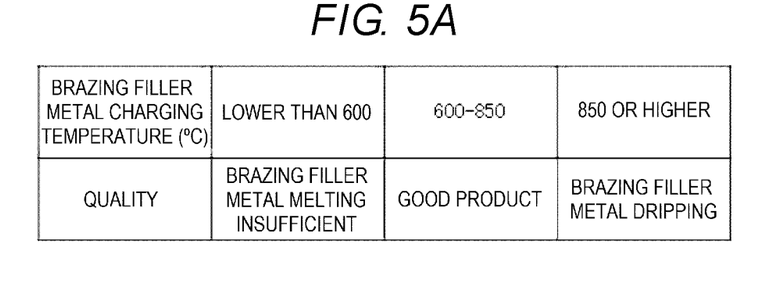
FIGS. 5A and 5B are diagrams showing results of a correlation analysis between work data stored in a brazing work measurement system and quality.

As a result of correlation analysis between the accumulated data (the work data) stored in the brazing work measurement system according to the first embodiment and the quality, a correlation was recognized between the brazing temperature and the quality, and the brazing temperature was extracted as a strong feature. FIG. 5A shows a relation between the brazing temperature and the quality. It was known that when the temperature of any one of measurement points 401(*a*), 401(*b*), 401(*c*), and 401(*d*) is lower than 600° C. at the time of charging a brazing material, the brazing material is not sufficiently melted and the product is defective, and when the temperature is 850° C. or higher, the brazing material is excessively melted and the brazing material is dripped.

Figure 5B:
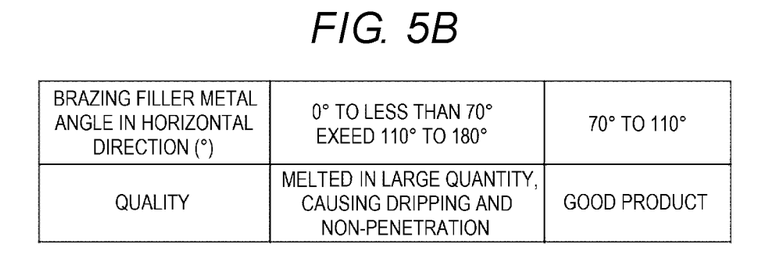

As shown in FIG. 5B, a correlation between a charging angle of the brazing filler metal 4 in a horizontal direction and the quality is recognized. That is, when the charging angle of the brazing filler metal 4 in the horizontal direction is 70° to 110°, since the brazing filler metal 4 gradually melts from a tip, the brazing material 4 properly penetrates into a gap between the outer tube 103 and the inner tube 104 of the joint 102, and when the charging angle of the brazing filler metal 4 in the horizontal direction is less than 70° or the charging angle of the brazing filler metal 4 in the horizontal direction exceeds 110°, the brazing filler metal 4 is in contact with the object to be brazed 2 with a line, and the brazing filler metal 4 drips or penetrates insufficiently.

In this way, in the quality control system according to the present embodiment, a feature having a strong correlation with the quality can be extracted from the work data stored in the brazing work measurement system according to the first embodiment, and the quality can be controlled. Although the temperature at the time of charging the brazing filler metal and the angle of the brazing filler metal 4 are used as features in the present embodiment, the invention is not limited thereto, and various data acquired by the brazing work measurement system according to the first embodiment can be used as features.

The quality control system can prevent a defective product and detect a defective product by notifying the worker 5 when the features are out of an appropriate range shown in FIGS. 5A and 5B. As a notification method, a warning sound or a voice that is easy to notice during work is preferable.

Next, the education system to which the brazing work measurement system according to the first embodiment is described. As a result of an analysis of a correlation between the work data stored in the brazing work measurement system according to the first embodiment and an appropriate operation by the education system according to the present embodiment, it is known that the angle of the flame in the horizontal direction is appropriately 75° to 105°, and the temperature rise is delayed when the angle is out of the range. Therefore, the appropriate range of the angle of the flame in the horizontal direction may be presented to the worker 5 and used for education. A function of notifying the worker 5 when the angle of the flame in the horizontal direction is out of the range may be achieved.

Based on the work data, it was known that there is an appropriate range of the color of base material. An education effect can be improved by teaching such a determination point.

As described above, in the invention, the brazing work operation can be accurately quantified, and by using the numerical data for quality control and education, the quality can be improved, skills can be reliably transferred, and it can contribute to the reduction of a defective rate.

In the invention, the brazing work using the brazing filler metal is used as an embodiment, but if the brazing work is a work using a burner, another work can also be applied. Examples of another work includes, for example, a gas cutting work of cutting metal by irradiating the metal or the like with a burner, a surface processing of cleaning or modifying a metal surface.

The invention is not limited to the above embodiments and includes various modifications and equivalent configurations within the spirit of the claims. For example, the above embodiments have been described in detail in order to make the invention easy to understand, and the invention is not necessarily limited to those which include all the configurations described. Further, a part of the configurations of an embodiment may be replaced with configurations of other embodiments. Further, the configurations of other embodiments may be added to the configuration of an embodiment. Further, a part of the configuration of each embodiment may be added to, deleted from, or replaced with other configurations.

Further, a part or all of the configurations, functions, processing portions, processing means described above and the like may be implemented by hardware, for example by designing with an integrated circuit, or may be implemented by software, with a processor interpreting and executing a program that implements each function.

Information such as a program, a table, and a file for realizing each function can be stored in a storage device such as a memory, a hard disk, and a solid state drive (SSD), or a recording medium such as an IC card, an SD card, and a DVD.

Control lines and information lines indicate those that are considered necessary for description, and not all the control lines and the information lines necessary for implementation are shown. In fact, it may be considered that almost all the configurations are connected with each other.

What is claimed is:

1. A burner work measurement system configured to measure work using a burner producing a flame, comprising:
   one or more cameras configured to capture the work; and
   a processor configured to perform computing processing on an image captured by the one or more cameras, wherein
   the processor is configured to
      distinguish, based on the image, an inner flame of the flame with an outer flame of the flame,
      calculate a first distance between a work object and a tip of the inner flame, and
      create work data using the first distance and by calculating, based on the image, at least one of a first positional relation between the work object and the burner or flame, a second positional relation between the work object and a brazing filler metal, and a third positional relation between the burner or the flame and the brazing filler metal, and
   each of the first positional relation, the second positional relation, and the third positional relation includes a distance and an angle.

2. The burner work measurement system according to claim 1, wherein
   the one or more cameras are a plurality of cameras configured to capture the work object in different directions.

3. The burner work measurement system according to claim 1, wherein
   the processor is configured to estimate a temperature distribution of the work object using the image, and create the work data by further including the temperature distribution.

4. The burner work measurement system according to claim 3, further comprising:
   one or more thermometers configured to measure a temperature of the work object, wherein
   the processor is configured to correct the estimated temperature distribution using the temperature of the work object measured by the thermometer.

5. The burner work measurement system according to claim 4, further comprising:
   one or more thermometers configured to measure a temperature of the work object, wherein
   the processor is configured to associate the temperature of the work object with at least one of the first positional relation, the second positional relation, and the third positional relation, and evaluate a burner work.

6. The burner work measurement system according to claim 4, wherein
   the one or more thermometers are a plurality of thermometers configured to measure temperatures at two or more points in at least one of a front-rear direction, a height direction, and a circumferential direction of the work object.

7. The burner work measurement system according to claim 6, wherein
the processor includes a function of obtaining, based on the image, a change in emissivity and correcting the temperatures.

8. The burner work measurement system according to claim 4, wherein
the one or more thermometers are radiation thermometers.

9. The burner work measurement system according to claim 1, wherein
the processor is configured to detect, based on the image, at least one of a color of the flame and a color of the work object, and create the work data by further including the color of the flame and the color of the work object.

10. The burner work measurement system according to claim 9, wherein
the processor is configured to present a timing of starting a next operation to a worker using at least one of the color of the flame, the color of the work object, and a temperature of the work object, which are specified based on the image.

11. The burner work measurement system according to claim 1, wherein
the processor is configured to create, based on the image, data relating to wraparound or sagging of the brazing filler metal or fillet formation performed using the brazing filler metal, and create the work data by further including the data.

12. An education system configured to output data for education of a worker using the work data created by the work measurement system according to claim 1.

13. A quality control system configured to output data for controlling work quality using the work data created by the work measurement system according to claim 1.

14. The burner work measurement system according to claim 1, wherein
the first positional relation includes a second distance that is determined between a base of the work object and a location where the flame is applied on the work object, and a first angle that is the flame in a vertical direction of the work object,
the second positional relation includes a third distance that is determined between the base of the work object and a location where the brazing filler metal is applied on the work object, and a second angle that is the brazing filler metal in the vertical direction of the work object, and
the third positional relation includes a first position in a horizontal direction of the work object where the flame is applied on the work object, a second position in the horizontal direction where the brazing filler metal is applied on the work object, a third angle of the flame in the horizontal direction, and a fourth angle of the brazing filler metal in the horizontal direction.

* * * * *